US012465248B2

(12) United States Patent
Wong

(10) Patent No.: US 12,465,248 B2
(45) Date of Patent: Nov. 11, 2025

(54) METHOD OF SELECTING THE INTENSITY OF A LIGHT SOURCE FOR MONITORING AN ANALYTE IN BLOOD, AND A DEVICE THEREOF

(71) Applicant: Well Being Digital Limited, Pak Shek Kok (HK)

(72) Inventor: Ming Yip Wallace Wong, Pak Shek Kok (HK)

(73) Assignee: WELL BEING DIGITAL LIMITED, New Territories (HK)

( * ) Notice: Subject to any disclaimer, the term of this patent is extended or adjusted under 35 U.S.C. 154(b) by 559 days.

(21) Appl. No.: 16/981,690

(22) PCT Filed: Mar. 22, 2019

(86) PCT No.: PCT/CN2019/079237
§ 371 (c)(1),
(2) Date: Sep. 16, 2020

(87) PCT Pub. No.: WO2019/184812
PCT Pub. Date: Oct. 3, 2019

(65) Prior Publication Data
US 2021/0000391 A1  Jan. 7, 2021

(30) Foreign Application Priority Data
Mar. 27, 2018  (HK) .................... 18104213.3

(51) Int. Cl.
*A61B 5/1455* (2006.01)
*A61B 5/00* (2006.01)
(Continued)

(52) U.S. Cl.
CPC ........ *A61B 5/1455* (2013.01); *A61B 5/02416* (2013.01); *A61B 5/14532* (2013.01);
(Continued)

(58) Field of Classification Search
CPC .............. A61B 5/1455; A61B 5/02416; A61B 5/14532; A61B 5/1495; A61B 5/4866;
(Continued)

(56) References Cited

U.S. PATENT DOCUMENTS 5,112,124 A * 5/1992 Harjunmaa ........ A61B 5/14532
600/316
6,126,595 A * 10/2000 Amano .................... A61B 5/02
600/490
(Continued)

FOREIGN PATENT DOCUMENTS

CN  102165304 A  8/2011
CN  102176864 A  9/2011
(Continued)

OTHER PUBLICATIONS

Foreign Communication from a Related Counterpart Application, International Search Report and Written Opinion dated Jun. 28, 2019 International Application No. PCT/CN2019/079237 filed on Mar. 22, 2019.

*Primary Examiner* — Alex M Valvis
*Assistant Examiner* — Jonathan M Haney
(74) *Attorney, Agent, or Firm* — Conley Rose, P.C.; Michael W. Piper; Andrew M. Metrailer

(57) ABSTRACT

A method of monitoring an analyte in blood, particularly glycated-haemoglobin (HbA1c or HgbA1c) using two photoplethysmocharty (PPG) sensors, which are worn on the body of a subject. Each photoplethysmocharty sensor observes blood of the subject in a different wavelength. One of the wavelengths monitors glycated-haemoglobin. The other one of the wavelengths monitors the body of blood in general. The shapes of the pulses obtained by each of the PPG sensor from the subject are used to adjust the intensity of the light emitted by the PPG sensors into the subject. If on adjustment of the light intensity, the shapes of the pulses (Continued)

become similar, the size of the pulses can be used to provide quasi-quantification of the analyte.

15 Claims, 13 Drawing Sheets

(51) Int. Cl.
*A61B 5/024* (2006.01)
*A61B 5/145* (2006.01)
*A61B 5/1495* (2006.01)

(52) U.S. Cl.
CPC .......... *A61B 5/1495* (2013.01); *A61B 5/4866* (2013.01); *A61B 5/681* (2013.01); *A61B 5/7285* (2013.01); *A61B 2562/0238* (2013.01); *A61B 2562/06* (2013.01)

(58) Field of Classification Search
CPC .................. A61B 5/681; A61B 5/7285; A61B 2562/0238; A61B 2562/06
See application file for complete search history.

(56) References Cited

U.S. PATENT DOCUMENTS

| | | | |
|---|---|---|---|
| 9,649,039 B1* | 5/2017 | Brady | A61B 5/02007 |
| 2005/0209516 A1 | 9/2005 | Fraden | |
| 2007/0156036 A1 | 7/2007 | Pilon et al. | |
| 2007/0265532 A1 | 11/2007 | Maynard et al. | |
| 2009/0259116 A1 | 10/2009 | Wasserman et al. | |
| 2011/0152647 A1 | 6/2011 | Trombetta et al. | |
| 2011/0205535 A1* | 8/2011 | Soller | A61B 5/1455 356/300 |
| 2014/0171763 A1 | 6/2014 | Diab | |
| 2016/0097716 A1* | 4/2016 | Gulati | A61B 5/1495 250/340 |
| 2016/0302674 A1 | 10/2016 | Moyer et al. | |
| 2017/0156642 A1* | 6/2017 | Sekimoto | A61B 5/14503 |
| 2017/0156646 A1 | 6/2017 | Gulati et al. | |
| 2018/0020964 A1 | 1/2018 | Newberry | |
| 2020/0333312 A1* | 10/2020 | Islam | G01N 33/442 |

FOREIGN PATENT DOCUMENTS

| | | | | |
|---|---|---|---|---|
| CN | 103957793 A | * | 7/2014 | ......... A61B 5/02416 |
| CN | 106999115 A | | 8/2017 | |
| CN | 107666860 A | | 2/2018 | |
| CN | 108024745 A | | 5/2018 | |
| CN | 108778105 A | | 11/2018 | |
| CN | 108778109 A | | 11/2018 | |
| EP | 0335357 A2 | | 10/1989 | |
| JP | 2004229973 A | | 8/2004 | |
| JP | 2004290545 A | | 10/2004 | |
| WO | 03077761 A1 | | 9/2003 | |
| WO | 2012005696 A1 | | 1/2012 | |
| WO | WO-2017053925 A1 | * | 3/2017 | .......... A61B 5/0002 |
| WO | 2017168432 A1 | | 10/2017 | |

* cited by examiner

| Intensity of emission, increasing from 1 to 5 in an arbitrary unit | Pulse shape of wavelength for HgbA1c, 540nm (First PPG sensor) | Pulse shape of wavelength for blood, 940nm (Second PPG sensor) |
|---|---|---|
| 1 | ⌒ | ⌒ |
| 2 | ⌒ | ⌒ |
| 3 | ⌒ | ⌒ |
| 4 | ⌒ | ⌒ |
| 5 | ⌒ | ⌒ |

Figure 9b (https://www.researchgate.net/figure/Absorption-spectra-of-glucose_fig2_262568396)

METHOD OF SELECTING THE INTENSITY OF A LIGHT SOURCE FOR MONITORING AN ANALYTE IN BLOOD, AND A DEVICE THEREOF

CROSS-REFERENCE TO RELATED APPLICATIONS

The present application is a filing under 35 U.S.C. 371 as the National Stage of International Application No. PCT/CN2019/079237, filed Mar. 22, 2019, entitled "A METHOD OF SELECTING THE INTENSITY OF A LIGHT SOURCE FOR MONITORING AN ANALYTE IN BLOOD, AND A DEVICE THEREOF," which claims priority to Hong Kong Application No, 18104213.3 filed with the Intellectual Property Office of Hong Kong on Mar. 27, 2018 and entitled "A METHOD OF SELECTING THE INTENSITY OF A LIGHT SOURCE FOR MONITORING AN ANALYTE IN BLOOD, AND A DEVICE THEREOF," both of which are incorporated herein by reference in their entirety for all purposes.

FIELD OF INVENTION

The invention relates to the field of wearable monitors. In particular, the invention relates to monitors executing non-invasive methods for monitoring analytes in blood, such as glycated-haemoglobin.

BACKGROUND OF THE INVENTION

Diabetic and pre-diabetic conditions are normally identified by blood glucose levels. However, the level of blood glucose is not conclusively indicative of the conditions. For example, blood glucose level increases after a meal but it does not mean that the subject is diabetic. Conversely, a low blood glucose level can be created after insulin injection but this does not mean the subject is no longer diabetic. Furthermore, measuring blood glucose levels accurately is troublesome. Most home testing kits require the subject to have fast before blood may be drawn for testing. Typically, these tests require pricking a finger. Doing this on a daily basis is a torment to many people.

It has been proposed that the level of glycation of haemoglobin in blood is a better indicator of a diabetic condition then the level of free glucose in the blood. Glycation refers to the covalent bonding of a simple sugar to a protein or lipid molecule, without the controlling action of an enzyme. Glycated haemoglobin, HgbA1c in shorthand, is a form of haemoglobin that is covalently bound to glucose. HgbA1c is formed by haemoglobin's exposure to glucose in blood.

More specifically, HgbA1c is a measure of the beta-N-1-deoxy fructosyl analyte of haemoglobin. The origin of the naming is derived from Haemoglobin Type A, which is extracted by cation exchange chromatography. The first fraction to elute from the ion exchange column was designated HgbA0, the following fractions were designated HgbA1a, HgbA1b, and HgbA1c and so on.

Not all the haemoglobin in blood binds to glucose immediately on exposure. Glycation depends on equilibration and occurs only in a fraction of a person's blood. Exposure to normal levels of glucose produces a normal level of HgbA1c. If the level of blood glucose increases, the fraction of HgbA1c increases. Unfortunately, when the level of blood glucose falls, which happens relatively easily, the bonding of the glucose in the HgbA1c does not reverse. HgbA1c remains glycated until the red blood cell dies naturally. The lifespan of a red blood cell is four months. Therefore, HgbA1c remains in the body for a significant period of time even after the subject has made recent changes to his dietary habits.

Since red blood cells do not all die off at the same time, a measurement of HgbA1c can be taken to represent the overall glucose level in the past months. A monthly monitor of the level of HgbA1c has been taken in some studies as indicative of a three-month moving average of blood glucose level. Hence, monitoring of HgA1c obviates the need for daily blood sampling throughout the past three months just to get data to calculate the average glucose level in the same period. In other words, monitoring HgbA1c provides a sufficiently accurate accumulative indicator of whether blood sugar has been increasing or decreasing. HgbA1c measurement is now the preferred diagnostic test for diabetes and as an assessment test for glycaemic control.

As shown in the table below, a level of less than 6% of HgbA1c has been correlated to normal blood conditions. In about 6% to 6.5% of HgbA1c, the subject is considered pre-diabetic. Any level beyond 7% means the subject is diabetic.

|  | Glucose level in blood (mg/dl) | HgbA1c levels (%) |
| --- | --- | --- |
|  | 90 | 4.8 |
|  | 100 | 5.1 |
| normal | 117 | 5.7 |
| prediabetes | 137 | 6.4 |
| diabetes | 154 | 7 |
|  | 183 | 8 |

HgbA1c can be measured using spectrometric methods in the laboratory, in which the absorbance or transmission of light of a specific wavelength through a sample of blood is measured. In the days when HgbA1c has just been discovered, a sample of blood from the subject has to be drawn and the HgbA1c extracted by cation exchange column. The eluent is then placed in a transparent cell of specific dimensions, to be installed in the path of the spectrometer light. The dimensions of the cell have to be pre-determined in order that the path of light through the eluent is standardized. This is because the level of absorbance is directly related to the length of the transmission path through the eluent. Furthermore, the intensity of the incident light emitted into the eluent and the bandwidth of the wavelength have to be standardized. Without such standardizations, spectrometric results cannot be meaningfully compared and analysed.

Photoplethysmocharty (PPG) sensors are wearable detectors that project a source of light into the flesh of a subject and detect the absorbance of the transmitted light. Hence, PPG sensors can be thought of as crude forms of spectrometers which are applied onto the body. PPG sensors tend to be used indiscriminately of specific blood components, that is, the whole body of blood is measured instead of a specific analyte. The result is a crude sinusoidal signal which shows the surges of blood as pumped by the heart. Such PPG sensors find use in monitoring the pulse.

It is not possible presently for a PPG sensor to be used to quantify any particular blood component or analyte in-situ. For one reason, it is hard to replicate the position of the PPG on the subject each time it is worn afresh and the transmission path may vary. Secondly, the depth of the tissue and the amount of blood therein through which the PPG emitted light may penetrate, i.e. the transmission path length, is uncertain.

Light based oximeters measure oxygen level by irradiating both red and infrared light through a finger. The red and infrared light travel through oxygenated and deoxygenated haemoglobin differently, which is due to the difference in colour between oxygenated (bright red) and deoxygenated blood (dark red or blue). It is possible to quantify the extent of oxygenation because the transmission path through the finger is the same for both wavelengths. If the intensity of both the red and infrared light were known or calibrated in advance, the different levels of absorbance of the two wavelengths indicate the extent of oxygenation of the blood in the transmission path. However, these oximeters cannot be worn on many other parts of the body because of the need to transmit light to a detector. Light can only transmit though thin parts of the body such as the fingers or the ear lobes. Thicker parts of the body such as the biceps, thighs and wrists tend to absorb all the incident light and provide no transmission data. However, devices intended for monitoring the condition of a subject have to be wearable for prolonged periods of time, and tend be tied to such thicker parts instead of being clipped to the earlobe or finger.

Oximeters are restricted to using light in the wavelength of red or infrared, as light in the wavelength of other colours tend not penetrate or transmit through the finger.

Accordingly, no suitable device has been found which can measure HgbA1c in a subject outside of the laboratory, and there is also none which can be worn on the body comfortably.

It is therefore desirable to propose a non-invasive spectrometric method that can be worn onto the human or animal body to measure glycated haemoglobin or other kinds of analytes in blood.

STATEMENT OF INVENTION

In a first aspect, the invention proposes a method of selecting the intensity of a light source for monitoring an analyte in blood, comprising the step(s) of: providing the light source, the light source emitting light in a first wavelength into the tissue of the subject to obtain an analyte-pulse; providing a second light source, the second light source emitting light in a second wavelength into the tissue of the subject to obtain a blood-pulse; adjusting the intensity of the light emitted by the light source and/or the intensity of the light emitted by the second light source until the shape of the analyte-pulse and the shape of the blood-pulse are similar.

In other words, adjustment of the intensity of the light emitted by the light source and/or the intensity of the light emitted by the second light source is guided by the shape of the analyte-pulse and the shape of the blood-pulse.

Typically, extent of similarity is set by manufacturers, and this depends on the quality of each product. Hence, 'similar' refers to being similar above a pre-determined similarity threshold.

Typically, the analyte has an absorbance spectrum that shows an absorbance peak in a first wavelength and absence of any significant absorbance peak in a second wavelength; and blood has an absorbance spectrum that shows an absorbance peak in the second wavelength.

Preferably, but not necessarily, the absorbance spectrum of blood does not have an absorbance peak in the first wavelength. This is because blood is the basis of reference, or the background of the measurement, and is present in such a high quantity that any change in the amount of blood affecting readings of the fraction of the analyte in blood is negligible.

By monitoring the similarity of the pulse shape obtained by one wavelength to the pulse shape obtained by the other wavelength, the extent of penetration into the tissue of both wavelengths can be deduced and adjusted. Where similarity is high or identical, it means that the light of both wavelengths have penetrated to the same extent into the same layers of tissue and, therefore, the amount of blood which the light of each wavelength passes through is virtually identical or similar. In this case, the amount of absorbance of the first wavelength by the analyte to produce the analyte-pulse can be referenced to the amount of absorbance by the subject's blood of the second wavelength to produce the blood-pulse, and the amount of the analyte in the blood can be estimated by the ratio of the absorbance of the two wavelengths.

Typically, therefore, the method further comprises a step of comparing the size of the analyte-pulse with the size of the blood-pulse to monitor the analyte.

Optionally, the analyte in the blood in an artery of a life subject is glycated haemoglobin; and the first wavelength is selected from 1) about 275 nm, 2) about 340 nm to 350 nm, 3) about 415 nm to 420 nm, 4) about 540 nm; or 5) about 580 nm; and the second wavelength being in the red or infrared range.

Typically, infrared wavelength from 700 nm to 1000 nm or beyond can be used for most organic compounds. Preferably, the second wavelength is about 940 nm or 840 nm for monitoring blood content in the artery. Nevertheless, the second wavelength is not restricted to the infrared range and can be selected from any suitable ultraviolet or visible wavelength in 400 nm to 700 nm.

Optionally, the method comprises the further steps of: providing a third light source, the third light source emitting light in a third wavelength into the tissue of the subject to obtain a second-analyte-pulse; adjusting the intensity of the light emitted by the light source, the intensity of the light emitted by the second light source and/or the intensity of the light emitted by the third light source until the shape of the analyte-pulse, the shape of the second-analyte-pulse and the shape of the blood-pulse are similar, i.e. above a pre-determined similarity threshold.

Accordingly, the method also provides the possibility to analyse two analytes in blood with overlapping absorbance peak wavelengths, that is, the absorbance spectrum of a first analyte has a peak at a first wavelength where the absorbance spectrum of the second analyte also has a peak, but it is only by this wavelength that the first analyte may be monitored. If the absorbance spectrum of the second analyte has another significant peak at the third wavelength, and the absorbance spectrum of the first analyte has no significant peak at this third wavelength, the two analytes can measured by an embodiment that has the equivalent of three PPG sensors.

Furthermore, the method may comprise the step of: subtracting the amplitude of the second-analyte-pulse from the amplitude of the analyte-pulse to provide a reduced analyte-pulse; comparing the size of the reduced analyte-pulse with the size of the blood-pulse to monitor the analyte.

In a second aspect, the invention proposes a method of expressing a quantity of an analyte in blood, comprising a ratio of the size of a pulse obtained by measuring the absorbance by the analyte of light of a first wavelength to the size of a pulse obtained by measuring the absorbance by blood of light of a second wavelength; the analyte having an absorbance spectrum that shows the absence of any significant absorbance peak in the second wavelength; wherein the pulse of the first wavelength has the same shape as the pulse of the second wavelength.

Accordingly, there is no need to express the amount of the analyte in an exactly quantified mass to monitor change of the analyte amount in the body. The ratio can be used consistently as a new quantification unit to monitor change in the amount of the analyte in the subject's blood. If the analyte is glycated-haemoglobin, in other words, it is possible to use the ratio to monitor if the glycation has decreased over time without needing to prick a finger to draw blood for testing.

Optionally, the analyte is glycated haemoglobin; the first wavelength being selected from 1) about 275 nm, 2) about 340 nm to 350 nm, 3) about 415 nm to 420 nm, 4) about 540 nm; or 5) about 580 nm; and the second wavelength being in the red or infrared range.

Nevertheless, it is possible that the method further comprises the step of providing calibration to convert the expression of the quantity glycated haemoglobin into physical quantity of glycated haemoglobin.

In a third aspect, the invention proposes a blood analyte monitor comprising: a photoplethysmocharty sensor assembly having at least one light source and at least one optical sensor; the photoplethysmocharty sensor assembly capable of generating light of a first wavelength and light of a second wavelength through the tissue of a subject to be detected by the at least one sensor; an adjustment module capable of adjusting the intensity of the light of the first wavelength and/or the light of the second wavelength in response to the shape of a pulse signal obtain by the first wavelength and the shape of a pulse signal obtained by the second wavelength.

Typically, the adjustment module is capable of adjusting the intensity of the light of the first wavelength and/or the light of the second wavelength to provide that the shape of the pulse signal obtain by the first wavelength and the shape of the pulse signal obtained by the second wavelength are similar above a pre-determined similarity threshold.

The adjustment module is possibly software, a pre-programmed microcontroller or circuitry capable of performing the aforementioned function.

In different embodiments, the photoplethysmocharty sensor assembly can variously comprise one polychromatic light source supplying light to two sensors, or two monochromatic light sources supplying light to one sensor.

Typically, the photoplethysmocharty sensor assembly comprises a first photoplethysmocharty sensor and a second photoplethysmocharty sensor; the first photoplethysmocharty sensor having a light source which emits light in the first wavelength and an optical sensor which detects light in the first wavelength; the second photoplethysmocharty sensor having a light source which emits light in the second wavelength and an optical sensor which detects light in the second wavelength.

Optionally, the photoplethysmocharty sensor assembly is capable of further generating light of a third wavelength through the tissue of a subject to be detected by the at least one sensor; the adjustment module capable of adjusting the intensity of the light of the first wavelength, the light of the second wavelength and the light of the third wavelength to provide that the shape of the pulse signal obtain by the first wavelength, the shape of the pulse signal obtained by the second wavelength and the shape of a pulse signal obtain by the third wavelength are similar above a pre-determined similarity threshold.

Advantageously, therefore, the invention provides the possibility to detect HgbA1c. Furthermore, the invention provides the possibility to determine that the quantity of glycated haemoglobin in a subject is indicative of pre-diabetes.

Possibly, the invention provides information for long term monitoring of diet control for diabetic or pre-diabetic subjects.

BRIEF DESCRIPTION OF THE FIGURES

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

FIG. 9b shows how the embodiment of FIG. 1 is used to find pulse signals having similar or the same shape;

DETAILED DESCRIPTION OF EMBODIMENTS

Figure 1:
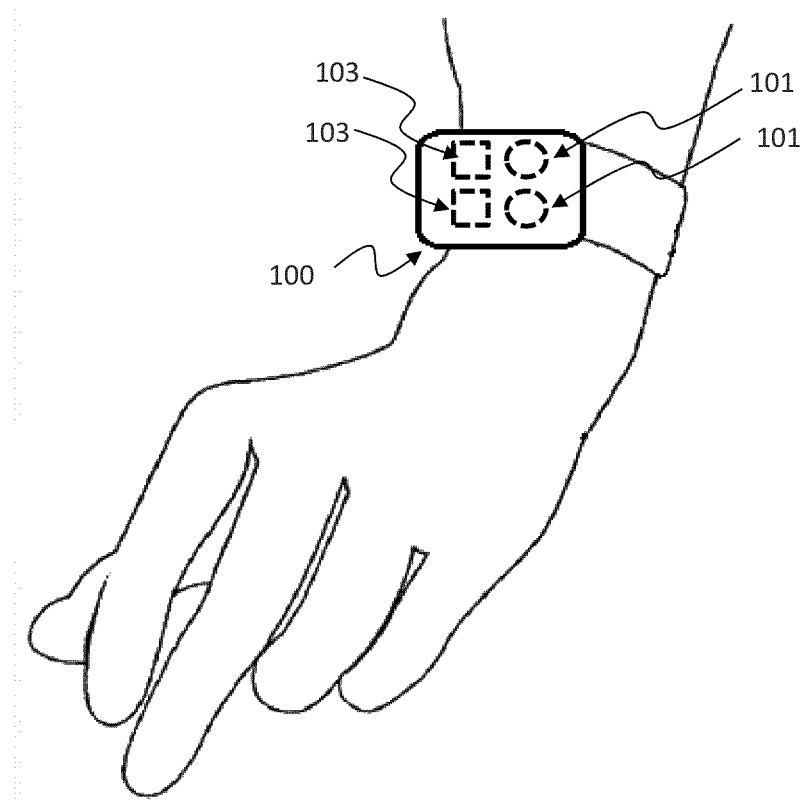
FIG. 1 shows an embodiment of the invention.

FIG. 1 shows a glycated-haemoglobin monitor 100 shaped like a watch. The glycated haemoglobin (HgbA1c) monitor is worn on one of the wrists of a subject. The underside of the glycated-haemoglobin monitor 100 comprises at least two pairs of photoplethysmocharty (PPG) sensors. The PPG sensors on the underside of the embodiment are placed snugly against the wrist in order to avoid ambient light from affecting the readings of the optical sensors 103.

Each of the two of PPG sensors comprises a light source 101 and an optical sensor 103. Typically, the light sources 101 are LEDs (light emitting diodes) and the optical sensors 103 are photodiodes. However, the skilled man understands that light sources suitable for irradiating into the subject's tissue besides LEDs may be used. Similarly, other optical detectors besides optical diodes may also be used.

In FIG. 1, each light source 101 is depicted by a circle. Each optical sensor 103 is placed next to the light source 101 and is depicted by a square. The broken lines represent the invisibility of the light sources and optical sensors when one views the display side of the glycated-haemoglobin monitor 100.

The light source 101 of the first PPG sensor emits light in a first wavelength different from a second wavelength emitted in by the light source 101 of the second PPG sensor. The first wavelength is suitable for monitoring HgbA1c. This means that a significant or useful absorbance peak is seen in that wavelength in the absorbance spectrum of HgbA1c. The respective optical sensor 103 senses light of the first wavelength specifically, usually by means of an optical filter.

An optical filter is typically a plastic membrane which allows only light of a specific wavelength to pass through. The optical filter is placed over the optical sensor 103 in the path of the incident light hitting the optical sensor 103, such that only light of the selected wavelength can pass through to excite the optical sensor 103.

In the second PPG sensor, the light source 101 preferably emits light in a red or infrared wavelength as the second wavelength. The respective optical sensor 103 senses only light of the same wavelength, also by a suitable optical filter. Typically, the absorbance spectrum of HgbA1c does not show any significant absorbance peak in the second wavelength.

Figure 2:
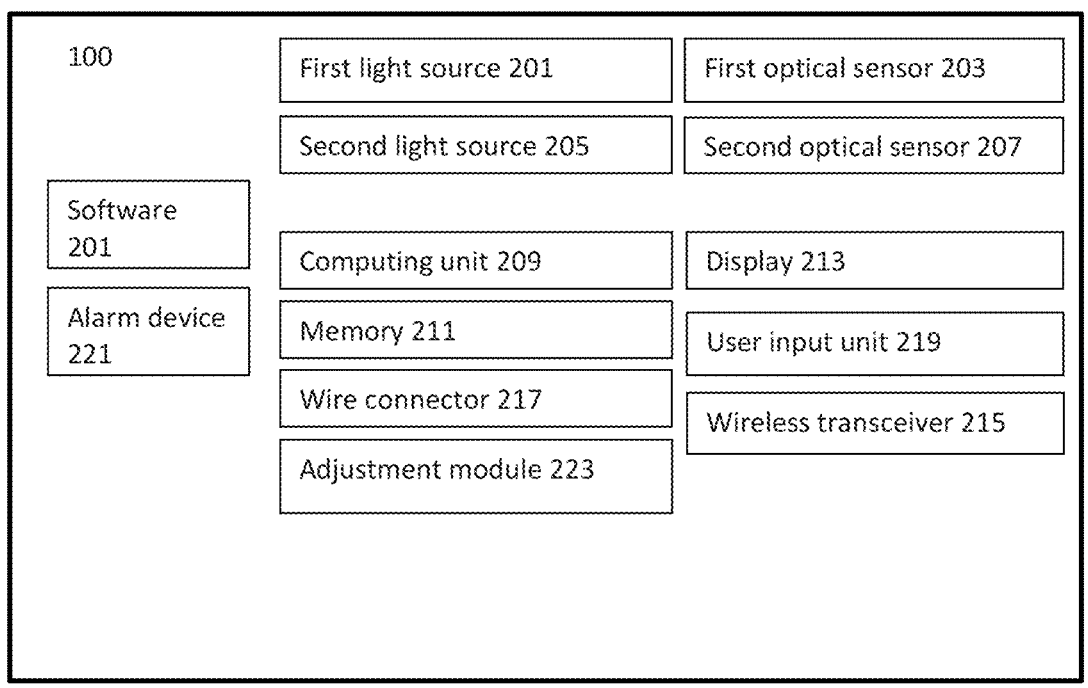
FIG. 2 shows the functional parts of the embodiment of FIG. 1 schematically.

FIG. 2 shows schematically functional modules which are preferably provided in the glycated-haemoglobin monitor 100. As mentioned, there are the first light source 201 and the first optical sensor 203 making up the first PPG sensor, and the second light source 205 and second optical sensor 207 making up the second PPG sensor.

In addition, there is a computing unit 209 and the required accompanying memory 211 for operating the glycated-haemoglobin monitor 100. Suitable software or firmware for the operation is typically installed in the memory.

A display 213 is provided as part of the glycated-haemoglobin monitor 100 for showing results as obtained by the PPG sensors. In some embodiments, the display 213 is omitted where the readings of the PPG sensors are intended to be downloaded into an external device only, instead of displayed on the glycated-haemoglobin monitor 100. The external device can be a memory storage such as a server or a computing device for making analysis based on the downloaded data.

A wireless transceiver 215 is provided for communicating data to the external device. Optionally, a physical connector 217 is provided for linking the glycated-haemoglobin monitor 100 to the external device by cable, for transmitting data to the external device.

A user input unit 219, such as soft pad buttons, is provided for the user to manipulate the functions of the glycated-haemoglobin monitor 100. Alternatively, the user input unit 219 is an interactive graphical user input (GUI) generated on the display 213.

Optionally, an alarm device 221 is provided to alert the subject that readings produced by the glycated-haemoglobin monitor 100 might show a cause for alarm, such as if the level of HgbA1c is very high. The alarm device 221 can be as simple as a sonic device making beeping sounds or a software alarm device creating a flashing message on the display 213.

The glycated-haemoglobin monitor 100 comprises an adjustment module 223 for adjusting the light intensity of either one or both of the first light source 201 and second light source 205. This adjustment module 223 is illustrated as separate module block in FIG. 2 for the ease of the reader's comprehension of the glycated-haemoglobin monitor 100. The skilled reader, however, understands that this adjustment module 223 can be a firmware or software installed within the computing unit 209.

Generally, a PPG sensor can be used to monitor blood content in a subject's arteries. Light emitted by the light source 101 of the PPG sensor into subject's tissue is scattered in all directions inside the tissue. A portion of the scattered light is reflected and propagates towards the optical sensor 103. Some of the light is absorbed by blood and tissue in the trajectory of the light towards the optical sensor 103.

Figure 3:
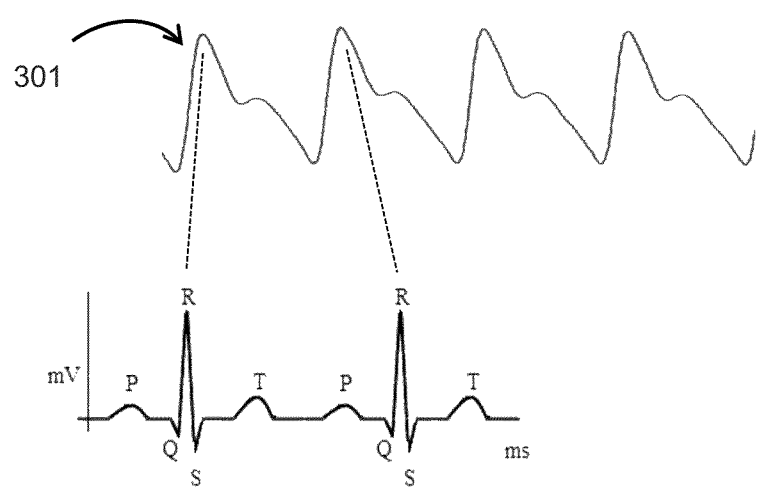
FIG. 3 shows the relationship between a electrocardiogram signal and a photoplethysmocharty signal, which is used to explain the workings of the embodiment of FIG. 1.

The amount of blood in the wrist pulsates as the heart pumps. In a heartrate cycle, the amount of light absorbed when the wrist is pumped full of blood by the heart is more than the amount of light absorbed when the wrist is relatively depleted of blood. Therefore, the output of a PPG sensor is a signal which has a sinusoidal waveform. That is, the PPG signal has alternating peaks and troughs, like an alternative current (AC). FIG. 3 shows a train of pulse which is typical of PPG signals 301, in which the peaks correlate to the R peak in the standard PQRST notation of an ECG (electrocardiogram) heart beat pattern.

Both the first and second PPG sensors measure absorbance of components in blood, and therefore produce such sinusoidal signals.

Figure 4:
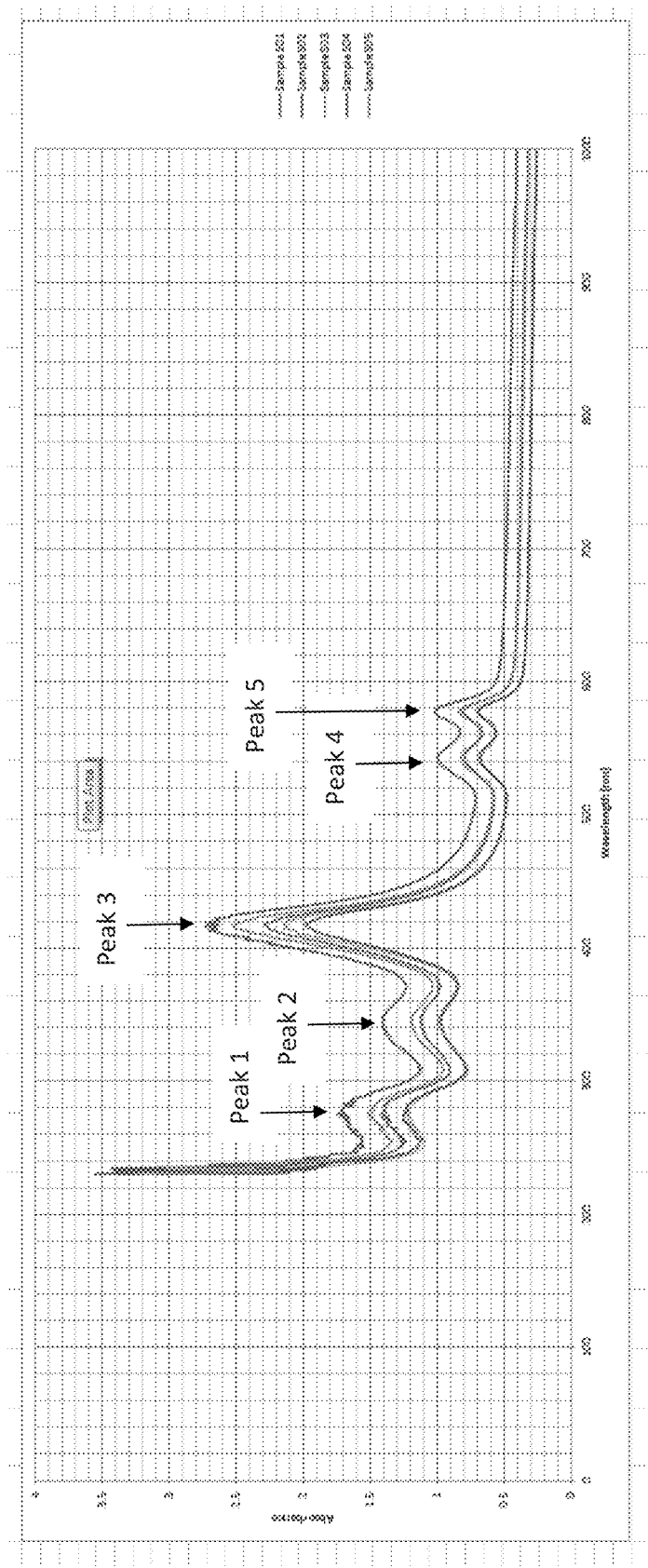
FIG. 4 shows the absorbance spectrum of glycated-haemoglobin which is used to explain the workings of the embodiment of FIG. 1.

FIG. 4 is an overlay of absorbance spectrums of five samples of human blood. The samples were taken from five people each having a known level of HgbA1c. The samples were diluted with Phosphate-buffered saline (abbreviated PBS) by 100 times, i.e. 1×PBS 100×. Absorbance of 100 µl of the diluted whole blood was measured in the ultraviolet-visible region (230 nm-1000 nm) using the Tecan Safire II Spectrophotometer. Background PBS levels were subtracted from the sample readings.

In the absorbance spectrums of all the five samples, there are five absorbance peaks seen within the spectrum range of 300 nm to 600 nm, labelled Peak 1, Peak 2, Peak 3, Peak 4 and Peak 5 in FIG. 4. Peak 1 has maximum absorbance at 275 nm. Peak 2 has maximum absorbance from 340 nm to 350 nm. Peak 3 has maximum absorbance from 415 nm to 420 nm. Peak 4 has maximum absorbance at 540 nm. Peak 5 has maximum absorbance at 580 nm. The wavelengths of any one of the five peaks, whether at tip or the slopes of each of the peaks, can be used for monitoring HgbA1c. However, common vernacular when referring to the wavelength of an absorbance peak usually means the wavelength where the tip of the peak is.

Figure 5:
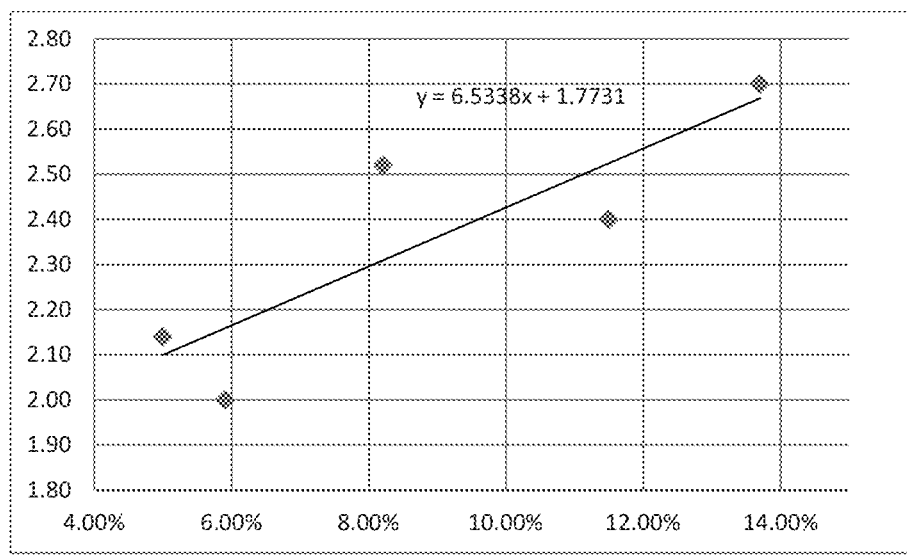
FIG. 5 shows the relationship between absorbance and glycated-haemoglobin, which is used to explain the workings of the embodiment of FIG. 1.

At a glance, the wavelength of Peak 3 is the best for quantitative monitoring of HgbA1c. HgbA1c shows the strongest absorbance at Peak 3 which, therefore, offers the best resolution for quantitative analysis. FIG. 5 is a plot of the absorbance of the five samples at the wavelength of Peak 3.

Table 1 below shows the absorbance data of Peak 3 for each of the blood samples.

TABLE 1

| Sample no. (not in order) | HgbA1c concentration (known in advance, and sorted in order) | Absorbance at 418 nm |
|---|---|---|
| 3 | 5.00% | 2.14 |
| 4 | 5.90% | 2 |
| 5 | 8.20% | 2.52 |
| 1 | 11.50% | 2.4 |
| 2 | 13.70% | 2.7 |

The absorbance reading at Peak 3 shows a trend with good general correlation with the HgbA1c values. The highest reading in Sample 2 corresponds to highest absorbance reading. At the lower end, Sample 3 and Sample 4, also correlate with the lowest readings.

These five samples were obtained from different people. Accordingly, each of the different blood samples has a different blood matrix, which explains the slight deviation from linearity. If readings were made on blood with varying HgbA1c levels sampled from the same person over time, the readings would show even better linearity (data not provided).

As can be seen, the plot is generally linear. This shows that it is possible to fit the Peak 3 readings of the five samples into a linear model for quantitative analysis of HgbA1c. In other words, HgbA1c respond to the wavelength of Peak 3 in accordance to the Beer-Lambert law.

In spectrometric technology, the Beer-Lambert law states that the amount of absorbance by a solution is directly proportional to both the concentration of the compound in the solution and the transmission path length through the solution.

The Beer-Lambert law is expressed as follows $$A = \log_{10}(I_0/I) = \varepsilon c L$$

Where
A is the measured absorbance (in Absorbance Units (AU))
$I_0$ is the intensity of the incident light at a given wavelength
I is the transmitted intensity
L is the path length through the sample, and
c is the concentration of the absorbing species.
For each species and wavelength, $\varepsilon$ is a constant known as the molar absorptivity or extinction coefficient.

The relationship between absorbance and concentration per the Beer-Lambert model is usually linear, but is sometimes a second order polynomial for very large and complex molecules. Accordingly, the linear model shown in FIG. 5 can be replaced by a polynomial model in actual products comprising an embodiment of the invention.

It is clear from the overlay of the absorbance spectrum of the five samples in FIG. 4 that the other peaks, Peak 1, Peak 2, Peak 4 and Peak 5, can also be used to provide a linear or polynomial model for quantitative analysis, albeit that these four peaks do not offer better resolution than Peak 3.

The wavelength of Peak 3 is in the violet colour region. A summary of colour wavelengths is provided below for the befit of the reader.

| Colour | Wavelength interval (nm) |
|---|---|
| Infrared | >700 |
| Red | 700-635 |
| Orange | 635-590 |
| Yellow | 590-560 |
| Green | 560-490 |
| Blue | 490-450 |
| Violet | 450-400 |
| Ultra-violet | <400 |

The wavelength of Peak 4 is in the green colour region and the wavelength of Peak 5 is in the yellow colour region.

Wavelengths towards the violet end of the spectrum have higher energy and wavelengths towards the red end of the spectrum have lower energy. Wavelengths of higher energy levels are more penetrative into different media than wavelengths of lower energy levels. Hence, blue light is less penetrative than green light, which is in turn less penetrative than red light.

Therefore, while Peak 3 is the strongest peak in the HgbA1c absorbance spectrum, the wavelength of Peak 3 does not penetrate as deeply into wrist tissue as the wavelengths of Peak 4 and Peak 5, given equal intensity. On the other hand, wavelengths of Peak 4 and Peak 5 have relatively poorer resolution for quantitative analysis than that of Peak 3.

Contrary to conventional tendency to choose the wavelength of Peak 3 to measure HgbA1c, the preferred wavelength for the present embodiment is that of Peak 4 or Peak 5 for their better penetration into the subject's tissue.

Turning now to the second PPG sensor, the choice of a red or infrared wavelength as the second wavelength in the second PPG sensor is useful for monitoring the amount of blood content in arteries, as much of the make-up of blood, such as the plasma, is organic. Virtually all organic compounds will absorb infrared wavelengths that correspond in energy to their molecular vibrations. Hence, the second wavelength can be selected from any wavelength starting from 700 nm up, after giving due consideration to signal noise caused by ambient and body heat infrared radiation.

In one preferred embodiment, the second wavelength is 940 nm. This is because LEDs providing light of this wavelength are already commercially available.

Furthermore, blood is capable of absorbing this wavelength but the absorbance spectrum of HgbA1c of FIG. 4 shows no absorbance peak at this wavelength. LEDs of the wavelength 880 nm are also available commercially, with the same advantages, and may also be used.

Figure 6:
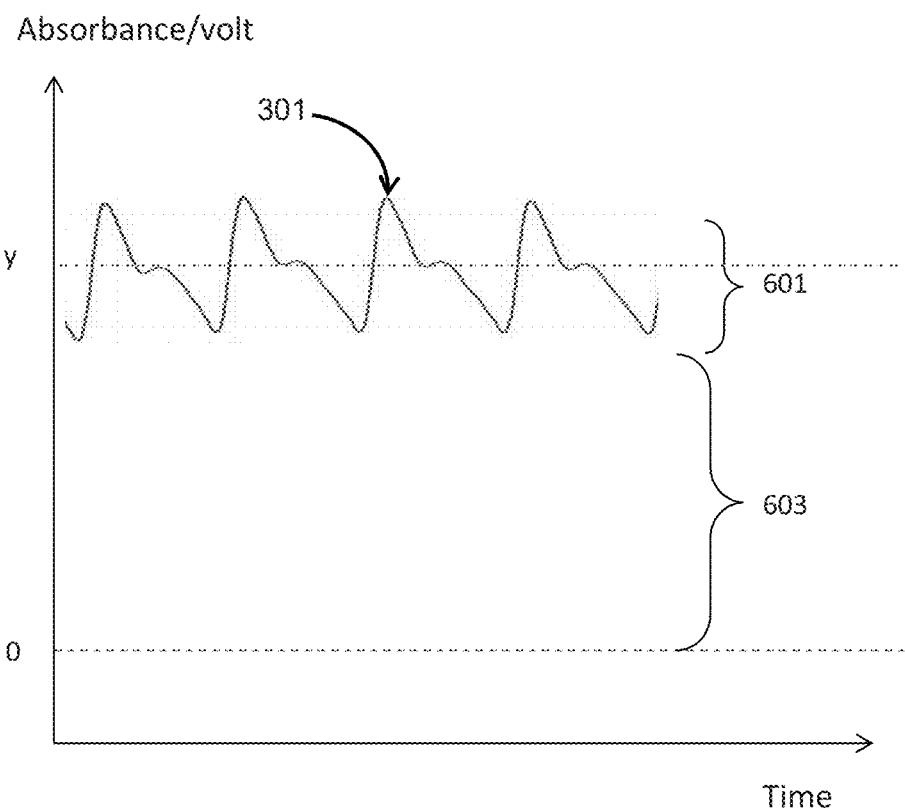
FIG. 6 illustrates the PPG waveform obtained using the embodiment of FIG. 1.

FIG. 6 is an illustration of a typical PPG signal obtained from the heartbeats of the subject. The PPG signal 301 comprises an AC part 601 that is superimposed on a larger non-pulsating DC (direct current) part 603. The vertical-axis of FIG. 6 shows absorbance. However, the photodiode of the PPG sensor detects light and outputs data in volts. Hence, the vertical axis can also show volts.

The AC part 601 is caused by surges of blood in the arteries. The DC part 603, indicated as having a magnitude of y, is caused by relatively unchanging parts of the body, such as skin, tissue, and venous blood, which also absorb the light emitted by the PPG sensor. Hence, the DC part 603 forms a stable baseline in the PPG signal.

To read data on analytes in arterial blood, both the signals read by the two PPG sensors are treated to extract their respective AC parts.

Figure 7:
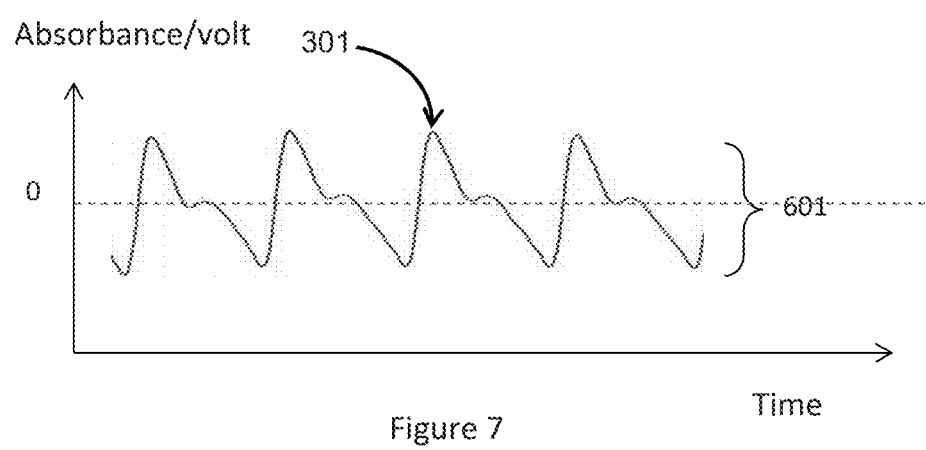
FIG. 7 shows the PPG waveform treated to remove DC components.

The AC part 601 is extracted by subtracting the baseline, i.e. the DC part 603, from the PPG signal 301. The extracted AC part 601 is then divided by the DC part 603. In other words, the extracted AC waveform is normalized to its AC/DC ratio. FIG. 7 shows an illustration of a pulse, which is the extracted and normalized AC part 601 centred about 0 volt.

The pulses of the first and second PPG sensors obtained by extraction and normalization of the respective AC parts can be compared with each other by size. The size of the pulse of the first PPG sensor referenced to the size of the pulse of the second PPG sensor provides an indication of the amount of HgbA1c in blood. Without normalization of the AC part to the DC part, the pulses cannot be compared as the absolute amplitude of the PPG signal may vary with the quality of the PPG light source 101 and optical sensor 103, and the size of the merely extracted AC part vary accordingly.

However, the transmission paths of the emissions of the two PPG sensors have to be similar or the same before the readings of the first PPG may be referenced to the readings of the second PPG. Having similar transmission path gives a similar effect as providing a standardized cell path and standardized incident light intensity in a laboratory spectrometer, allowing reproducible measurements. This is provided by adjusting the intensity of the light emitted by one or both of the PPG sensors, until the shape of the pulse obtained by the first PPG sensor is the same as the shape of the pulse obtained by the second PPG sensor. Producing the same pulse shape indicates that the light of both the PPG sensors, as detected by their respective optical sensor 103, have reached to the same depth in the tissue, and have passed through the same layers of tissues and same amount of arterial blood.

Hereon, the pulse obtained by the first PPG sensor is termed the HgbA1c-pulse, and the pulse obtained by the second PPG sensor is termed the blood-pulse for clarity.

FIG. 8, FIG. 8a, FIG. 9 and FIG. 9a illustrate schematically the effect of varying the intensity of the light of the two PPG sensors.

Figure 8:
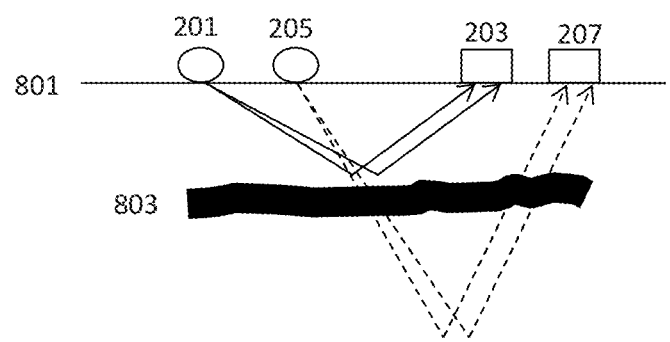
FIG. 8 shows how the embodiment of FIG. 1 works.

In FIG. 8, the first light source 201 and first optical sensor 203 making up the first PPG sensor, and the second light source 205 and second optical sensor 207 making up the second PPG sensor are shown. The first and second PPG sensors are shown placed on the skin 801 of a subject. Beneath the skin 801, in the tissue of the subject, are arteries 803 through which blood surges. Each of the light sources 201, 205 is illustrated as emitting light which is scattered or reflected by tissue layers and then detected by the respective optical sensor 203, 207, as shown by the arrow-headed lines.

Figure 8A:
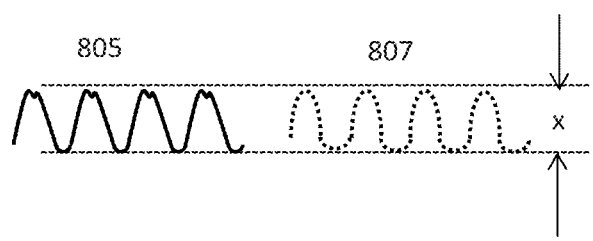
FIG. 8a shows the result of the embodiment's workings in FIG. 8.

FIG. 8a shows the HgbA1c-pulse 805 read by the first PPG sensor in solid lines, and the blood-pulse 807 read by the second PPG sensor in broken lines. The intensity of the light emitted by both PPG sensors is such that the HgbA1c-pulse 805 and the blood-pulse 807 have the same amplitude, as marked by a letter x. However, as the two PPG sensors operate in different wavelengths, this may mean that the penetration by the infrared light of the second PPG sensor into the tissue is deeper than the penetration by the light of the first PPG sensor. In this case, the light of the two PPG sensors have passed though different layers of tissues and arteries, and measured different amounts of blood. As a result, the shape of the HgbA1c-pulse 805 and the shape of the blood-pulse 807 are not the same. This is illustrated in the HgbA1c-pulse 805 having two sub-peaks but the blood-pulse 807 having only one peak.

The pulse of a person is generally a periodic signal most of the time. A single beat of the pulse can be obtained by truncating the beats before it and the beats after it in a train of pulse. The shape of a single beat of pulse, as the skilled man knows, can be characterised in many ways, and these includes counting the number of sub-peaks forming the pulse, measuring the angle of the slopes forming the sides of the pulse, measuring the spread of the base of the pulse and so on. All these aspects may be taken into consideration when comparing two pulses.

Pulses of different sizes can have the same shape. Therefore, in order to mathematically or programmatically compare shape of two pulses, the pulses have to be scaled to the same size. After scaling to the same size, similarity of pulse shapes can be determined mathematically in one or more of the following ways, for example, by comparing a pulse with a shape template, by comparing the timing and position of the peaks and troughs making up the pulses, or by comparing variation of timing and so on. The timing of the tips and dips of two pulses can be mathematically identified and compared using their first derivative. This method is best accompanied by calculating and comparing the gradient of the slopes of the pulses. To be even more accurate, some variations of the embodiment require that two pulses should correlate in both shape and phase before they are considered similar.

Also, pulse shapes can be compared using signal processing techniques, particularly digital signal processing techniques, such as using signal correlation algorithms, using a matching filter to match the pulse shapes, or using signal deconvolution techniques. Alternatively, a pulse can be converted into the frequency domain to be compared to another pulse by frequency components.

Methods of comparing pulse shapes are known and do not require further or more specific elaboration here.

The threshold or standard to deem two pulses similar is a product-specific mathematical or statistical standard that can be determined differently by different manufacturers.

After the pulses from the two PPG sensors are deemed to have the same shape, the un-scaled version of the pulses can be compared for their sizes.

Figure 9:
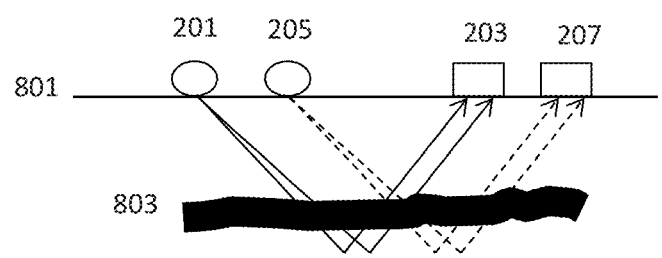
FIG. 9 also shows how the embodiment of FIG. 1 works.
Figure 9A:
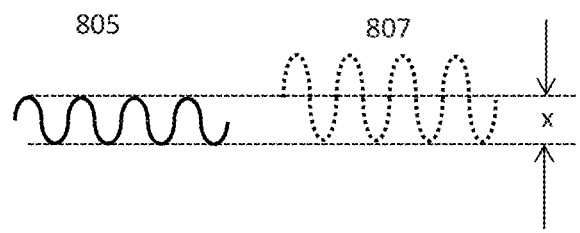
FIG. 9a shows the result of the embodiment's workings in FIG. 9.

FIG. 9 is a similar drawing to FIG. 8 but shows how, after adjusting either one or both of the intensity of the light emitted by the first PPG sensor and the second PPG sensor, the depth of penetration into the tissue by light of the first wavelength becomes the same as that of the second wavelength. As a result, as shown in FIG. 9a, the HgbA1c pulse 805 becomes the same as or highly similar to the shape of the corresponding blood-pulse 807. Having the same shape does not mean having the same size. FIG. 9a shows that, the amplitude of the blood-pulse 807 is bigger than the amplitude of the HgbA1c-pulse 805.

There can be different approaches to varying the intensity of the emitted light of the PPG sensors to find similar pulse shapes. In one of the approaches, the adjustment module 233 (FIG. 2) causes the intensity of the light emitted by the second PPG sensor to be maximised and held constant while the intensity of the light emitted by the first PPG sensor is maximised at first and then slowly decreased. At the same time, an HgbA1c-pulse 805 and the corresponding blood-pulse 807 are continually extracted from the PPG signals and compared by pulse shape. The shape of the HgbA1c-pulse 805 changes as the light intensity of the first PPG sensor changes. If the shape of the HgbA1c-pulse 805 matches the shape of the blood-pulse 807 at any stage, the iteration stops and the pulses are compared by size. If the shape of the HgbA1c-pulse 805 is unable to match the shape of the blood-pulse 807 across the entire range of light intensity of the first PPG sensor, the adjustment module 233 decreases the light intensity of the second PPG sensor by one arbitrary unit.

Decreasing the light intensity of the second PPG sensor changes the shape of the blood-pulse 807. The adjustment module 233 then maximises the light intensity of the first PPG sensor again, and slowly decreases it to find a pulse with a shape matching this changed shape of the blood-pulse 807. If the shape of the HgbA1c-pulse 805 is again unable to match the shape of the blood-pulse 807 across the entire range of light intensity of the first PPG sensor, the adjustment module 233 decreases the light intensity of the second PPG sensor by one further arbitrary unit, and the adjustment module 233 iterates through the different levels of light intensity of the first PPG sensor again.

Eventually, matching HgbA1c-pulse 805 and blood-pulse 807 are found by the adjustments of the light intensities of both the PPG sensors.

FIG. 9b illustrates how the shapes of the HgbA1c-pulse 805 and blood-pulse 807 changes with different light intensities of the PPG sensors. The intensity levels of light emitted by a PPG sensor are shown on the leftmost column in an arbitrary unit.

The middle column illustrates the change in shape of the HgbA1c-pulse obtained by the first PPG sensor. The rightmost column illustrates the change in shape of the blood-pulse obtained by the second PPG sensor. The shape of the pulses observed by each of the two PPG sensors is shown changing as the intensity of the light increases down the rows, from level 1 to level 5.

In FIG. 9b, the shape of the HgbA1c-pulse 805 at level 4 is the same as the shape of the blood-pulse 807 at intensity level 2, as indicated by the double headed arrow in FIG. 9b.

In another approach to varying the intensity of the emitted light of the PPG sensors to find similar pulse shapes, both PPG sensors are operated at the same time to collect all the different pulse shapes produced by different light intensities in advance, before comparing the pulse shapes. As the responsiveness of the target components in blood are not affected by light of the other wavelength, the adjustment module 223 can operate both the PPG sensors concurrently to record the different pulses. In this case, the adjustment module 223 maximises the intensity of the light of both the PPG sensors and then slowly decreases both the intensities by the arbitrary unit to obtain the PPG signals with different pulse shapes. That is, with regards to FIG. 9b, light of the wavelength 540 nm is emitted from level 5 to 1 in stages, and the HgbA1c-pulse 805 at each level of light intensity is recorded. Similarly, light of the wavelength 940 nm is emitted at level 5 to 1 in stages, and the blood-pulse 805 at each level of light intensity is recorded.

The microcontroller then compares the shapes of the pulse of the two different wavelengths at different light intensities to find the best shape match. The pulses having matching shapes are compared by size for evaluating the amount of HgbA1c.

In a variation of the embodiment, the microcontroller is not used to extract the AC part from the PPG signals to obtain the pulses. Instead, raw data as read by the optical sensors 103 of the PPG sensors is sent to an external computing device to perform the AC part extraction, normalization and comparison.

Accordingly, if the shape of the HgbA1c-pulse 805 and the shape of the blood-pulse 807 match, the size of the HgbA1c-pulse 805 and blood-pulse 807 can be used to provide a quasi-quantification of HgbA1c in blood.

Figure 10:
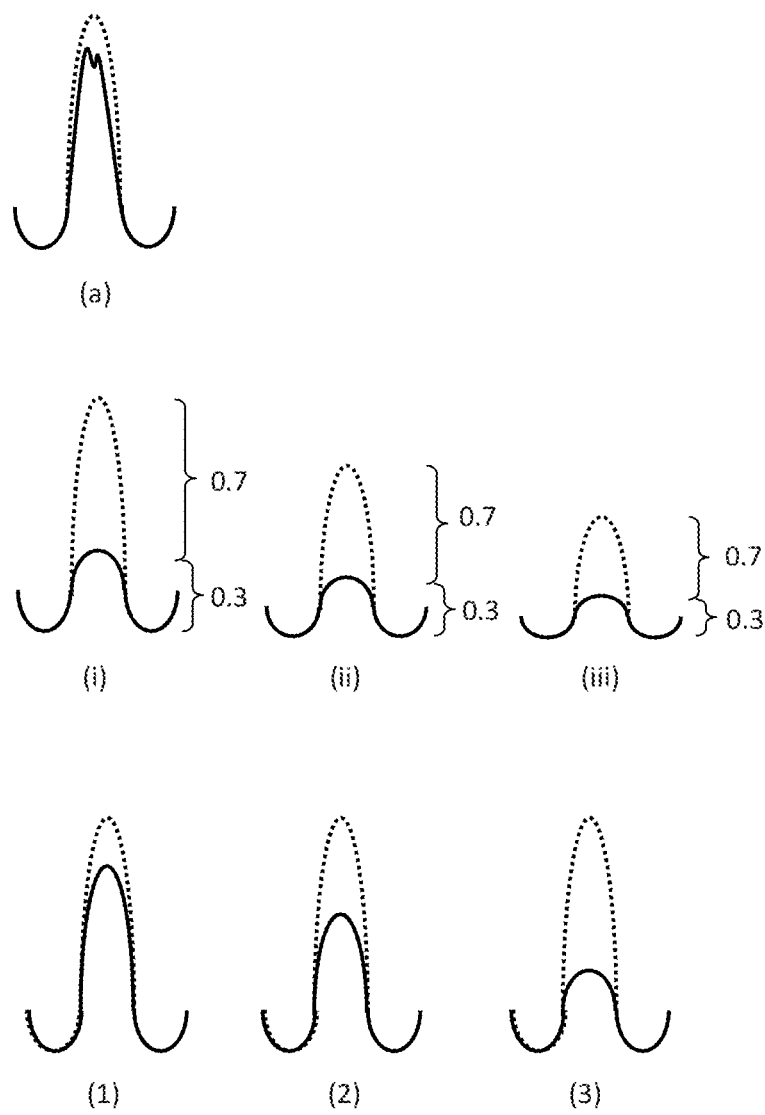
FIG. 10 illustrates readings obtained by the embodiment of FIG. 1.

FIG. 10 shows how the HgbA1c-pulse 805 and the blood-pulse 807 can be used to quantify HgbA1c in the subject. Each set of pulses in FIG. 10 parts (a), (i), (ii) and (iii), (1), (2) and (3) shows an HgbA1c-pulse 805 superimposed on a blood-pulse 807 to contrast their difference.

In FIG. 10 part (a), an HgbA1c-pulse 805 and a blood-pulse 807 with similar amplitudes are superimposed on each other. The pulse in solid lines represents the HgbA1c-pulse 805 while the pulse in broken lines represents blood-pulse 807. The HgbA1c-pulse 805 has two smaller peaks while the blood-pulse 807 has only one peak. Hence, the shapes of the pulses are different, and the two pulses are not produced by PPG light which have penetrated into the same depth in the tissue.

Accordingly, the size of these HgbA1c-pulse 805 and blood-pulse 807 are not comparable.

In FIG. 10 part (i) to (iii), and part (1) to (3), the HgbA1c-pulse 805 and the blood-pulse 807 have significantly similar shapes. This means that the extent of penetration of the light of both the PPG sensors into the tissue is the same. Therefore, the size of the HgbA1c-pulse 805 and the blood-pulse 807 in each of part (i) to (iii), and (1) to (3) can be directly compared.

The three sets of pulses in part (i) to (iii) have the same size ratio between the HgbA1c-pulse 805 to the blood-pulse 807, i.e. the HgbA1c-pulse 805 has a height which is 30% of the height of the blood-pulse 807.

However, the HgbA1c-pulse 805 and the blood-pulse 807 in part (i) are bigger than the respective HgbA1c-pulse 805 and the blood-pulse 807 in part (ii), which are in turn bigger than the respective HgbA1c-pulse 805 and the blood-pulse 807 of part (iii). Such different pulse sizes can be read from the same subject if three different glycated-haemoglobin monitors 100 are used to measure the same subject's HgbA1c level. Each of the glycated-haemoglobin monitors 100 may have randomly varying light source efficiency and optical sensor sensitivity, leading to the different pulse sizes. However, the different glycated-haemoglobin monitors 100 all read the same HgbA1c levels, because the ratio of the HgbA1c-pulse height to the blood pulse height is the same. Accordingly, FIG. 10 parts (i), (ii) and (iii) show the same amount of HgbA1c in the subject's blood.

FIG. 10 parts (1), (2) and (3), on the other hand, show a progressively diminishing amount of HgbA1c in blood. This happens in the same subject over time if his dietary control of sugar intake is successful.

For example, at the time FIG. 10 part (1) was obtained, the subject had a high level of HgbA1c, as the ratio of the amplitudes of the HgbA1c-pulse 805 to blood-pulse 807 is the biggest among parts (1), (2) and (3).

After a month of dietary control, for example, the subject tested his HgbA1c levels using the same glycated-haemoglobin monitor 100. If the glycated-haemoglobin monitor 100 is the same, the efficiency of the light sources and the sensitivity of the optical sensors in the PPG sensors are the same. Hence, the heights of the blood-pulse 807 in parts (1), (2) and (3) are the same. However, part (2) has a smaller HgbA1c-pulse 805 to blood-pulse 807 ratio, which means there is less HgbA1c in the subject's blood.

Part (3) has an even smaller HgbA1c-pulse 805 to blood-pulse 807 ratio than part (2), signifying even lesser HgbA1c in the subject's blood.

Besides the pulse height, there are other ways to compare the size of the pulses. For example, the area under the curve of the HgbA1c-pulse can be compared to the area under the curve of the blood-pulse. These methods are known and further examples do not need to be given here.

Advantageously, the ratio of the HgbA1c-pulse size to the blood-pulse size may be used as a new standard for evaluating HgbA1c level in blood, i.e. a quasi-quantitative measurement, without need of calibrating the PPG signals to actual HgbA1c concentration. The subject can simply track the success of his dietary control merely by monitoring the HgbA1c-pulse 805 to blood-pulse 807 ratio.

Advantageously, the size ratio of the HgbA1c-pulse 805 to the blood-pulse 807 can be used as a guide to suggest meals, restaurants, activities and nutritional supplements.

Figure 11:
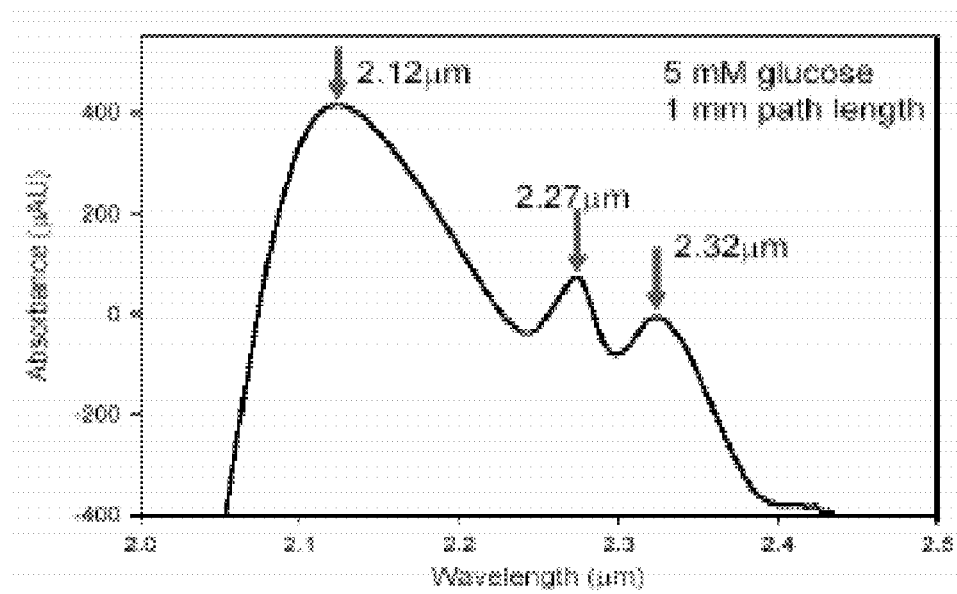
FIG. 11 illustrates the absorbance spectrum of glucose which can be applied in an embodiment alternative to that of the embodiment in FIG. 1.

Besides HgbA1c, other analytes in blood can be monitored using this method, such as free glucose in blood, hormones, vitamins, ions and so on. To illustrate this, FIG. 11 shows the spectrum of glucose in the infrared region, showing three distinct peaks. The wavelength of anyone of these peaks can be used in the first PPG sensor as the first wavelength for monitoring glucose level, provided that the absorbance spectrum of glucose does not have any significant absorbance peak in the second wavelength, such as in 940 nm. This example shows that the first wavelength is not restricted to the ultraviolet-visible wavelength range.

Figure 12:
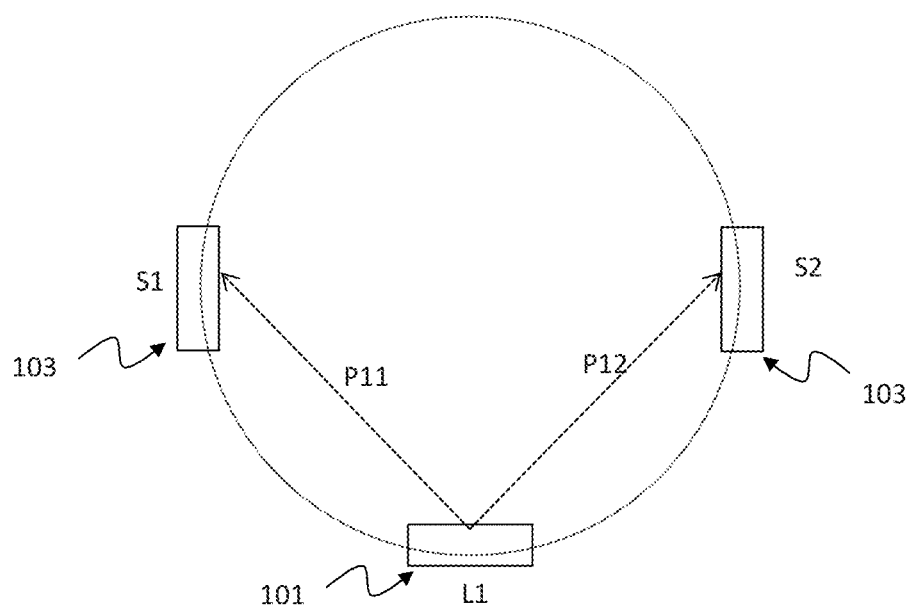
FIG. 12 illustrates a variation to the configuration of light source and optical detector of the embodiment of FIG. 1.

FIG. 12 shows a variation of the embodiment in which there is a PPG assembly having one light source 101, L1, emitting light to two optical sensors 103, S1 and S1. This is unlike the earlier described embodiment having two PPG sensors, providing a total of two light sources 201, 205 and two optical sensors 203, 207.

'PPG assembly' refers to any combination of PPG light sources 101 and optical sensors 103, including the conventional configuration of one-to-one light source and optical sensor pair and more. In this case, the light source L1 emits polychromatic light into the wrist of the subject, as shown in FIG. 1, which includes both the first and second wavelengths required for detecting HgbA1c and for monitoring the amount of blood in the arteries.

The optical sensors S1 and S2 are wavelength selective, however. Each of the optical sensors S1 and S2 has an optical filter to allow only passage of a pre-determined wavelength. Hence, the pulse obtained by the wavelength for monitoring HgbA1c and the pulse obtained by the wavelength for monitoring blood content in the arteries can be obtained using only one light source, L1.

Figure 13:
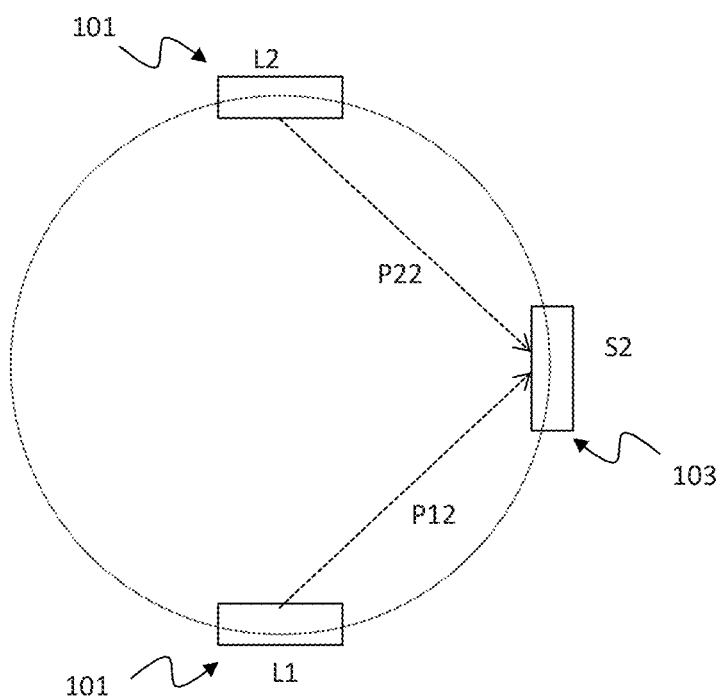
FIG. 13 illustrates a further variation to the configuration of light source and optical detector of the embodiment of FIG. 1.

FIG. 13 shows a further variation of the embodiment in which there is a PPG assembly having two monochromatic light sources 101, namely L1 and L2. One of the light sources 101 emits light in a wavelength for detecting HgbA1c while the other emits light in a wavelength for monitoring the amount of blood in the arteries.

In one mode of operation, the light from the light sources L1 and L2 propagate through the tissue towards the same optical sensor 103 alternatively, changing over from L1 to L2 and back to L1 very quickly and periodically, such as every 10 milliseconds.

Preferably, in another mode of operation, the optical sensor S2 detects and records changes in pulse shape as the intensity of the light emitted by the monochromatic light source L1 changes, and the monochromatic light source L2 is switched off or waits in a standby mode.

Subsequently, L2 is switched on and L1 is switched off or is put into standby, and S2 detects and records changes in pulse shape as the intensity of the light emitted by L2 changes. After that, the shapes of the pulses obtained at different levels of light intensity from L1 and L2 are compared for shape similarity.

The embodiments as described can be further modified to analyse two analytes in blood with overlapping absorbance peaks. That is, the absorbance spectrum of a first analyte has a peak at a first wavelength where the absorbance spectrum of the second analyte also has a peak, but it is only by this first wavelength that the first analyte may be monitored. If the absorbance spectrum of the second analyte has another significant peak at a second wavelength, and the absorbance spectrum of the first analyte has no significant peak at this second wavelength, the two analytes can be measured by an embodiment that has three PPG sensors. Typically, the absorbance spectrum of blood also does not have an absorbance peak in this second wavelength.

More specifically in the further modified embodiment, one PPG sensor emits in the first wavelength and is used to monitor the first analyte. However, the absorbance spectrum of the second analyte also has an absorbance peak in the first wavelength and interferes with the reading of the first analyte. A second PPG sensor emits in a second wavelength and is used to monitor the second analyte. The absorbance spectrum of the first analyte does not have an absorbance peak in the second wavelength.

A third PPG sensor emits in a third wavelength and is used to monitor arterial blood content. The absorbance spectrum of the first analyte and the second analyte do not have any significant absorbance peak in the third wavelength. As with the afore-described embodiments, the intensities of the light emitted by the three PPG sensors are adjusted until pulses obtained by all three wavelengths correspond in shape. When the shapes of the pulses are the same, the pulses may be compared by size.

The height of the pulse obtained in the first wavelength for measuring the first analyte is firstly subtracted by the height of the pulse obtained in the second wavelength for measuring the second analyte. This removes the interference of the second analyte on the measurement of the first analyte. Subsequently, the remainder of the pulse of the first analyte is referenced to the blood-pulse 807 to quantify the amount of the first analyte in blood.

In the same way, further embodiments for distinguishing the amount of an analyte from interfering effects of two or more other analytes are possible.

Accordingly, a method has been described wherein pulses obtained by emitting light of two or more wavelengths into tissue are compared. Where the shapes of the pulses are the same, it means that the light of the wavelengths has penetrated into the same depth in the subject's tissue. If the shapes of the pulses are the same, the size of the pulses can be compared for quantification.

The embodiments as described include a method of selecting the intensity of a light source for monitoring an analyte in blood, comprising the step(s) of: providing the light source the light source emitting light in a first wavelength into the tissue of the subject and obtaining an analyte-pulse 805; providing a second light source, the second light source emitting light in a second wavelength into the tissue of the subject to obtain a blood-pulse 807; adjusting the intensity of the light emitted by the light source and/or the intensity of the light emitted by the second light source until the shape of the analyte-pulse 805 and the shape of the blood-pulse 807 are similar. As the skilled man knows, similarity means similarity above a pre-determined similarity threshold level and, although it is preferably but not necessarily identical.

Furthermore, the embodiments as described include a blood analyte monitor 100 comprising: a photoplethysmocharty sensor assembly having at least one light source and at least one optical sensor; the photoplethysmocharty sensor assembly capable of generating light of a first wavelength and light of a second wavelength through the tissue of a subject to be detected by the at least one sensor; an adjustment module for adjusting the intensity of the light of the first wavelength and/or the light of the second wavelength in response to the shape of a pulse signal obtain by the first wavelength and the shape of a pulse signal obtained by the second wavelength.

Typically, the adjustment module is capable of adjusting the intensity of the light of the first wavelength and/or the light of the second wavelength to provide that the shape of the pulse signal obtain by the first wavelength and the shape of the pulse signal obtained by the second wavelength are similar above a pre-determined similarity threshold.

While there has been described in the foregoing description preferred embodiments of the present invention, it will be understood by those skilled in the technology concerned that many variations or modifications in details of design, construction or operation may be made without departing from the scope of the present invention as claimed.

For example, besides a wrist-wearable device, the two or more PPG sensors described above can be implemented in the form of wrist bands, watches, rings for fingers, earphones with sensing in the ear canal, an arm band for the upper arm. Furthermore, the PPG can be woven into clothes, such as T-shirt, brasseries, underwear. Yet furthermore, the PPG can be installed in shoes, socks, helmets, hats and eyewear such as on the spectacle legs that contact the scalp. As long as the PPG sensors can be held tightly against the skin to irradiate light into the skin, the above described analysis can be conducted.

Although the wavelengths of Peak 4 or Peak 5 are the preferred choice, it is nevertheless possible to use stronger light source in the wavelength of Peak 3 remedy the shallow penetration.

Furthermore, artificial intelligence can used to improve the comparison of the pulse shapes and to identify and quantify the blood analyte.

Furthermore, it is possible to calibrate the readings of the first PPG sensor, or the afore-mentioned ratio of the size of the pulse of the first PPG sensor to the size of the pulse of the second PPG sensor to an absolute value of, or to a physical quantity of HgbA1. The skilled man understands that absolute value or physical quantity refers to the amount of glycated haemoglobin in grams, milli-grams, micro-grams, grams per litre of blood, grams per decilitre of blood and so on. The skilled man also understand that calibration includes, for example, applying the invention onto a different subject with known amount of glycated haemoglobin in his blood and taking the ratio of the size of a pulse obtained by measuring the absorbance by the analyte of light of a first wavelength to the size of a pulse obtained by measuring the absorbance by blood of light of a second wavelength. Subsequently, the ratio is deemed equivalent to the known amount of glycated haemoglobin. More than one subject with known amount of glycated haemoglobin in his blood may be used to provide multi-point calibration. After calibration, other readings of the ratio of the pulses of the first PPG sensor and the second PPG sensor can be converted by the calibration into absolute value of, or to a physical quantity of HgbA1.

Optionally, a subject can have the amount of his glycated haemoglobin tested, and the calibration of his glycated-haemoglobin monitor 100 can be calibrated by using his own glycated haemoglobin amount, as a one point calibration. Subsequently, this calibration can be used for a long period, up to several months, to convert subsequent readings of the ratio of the HgbA1c pulse to blood-pulse detected in this subject's blood into actual amount of HgbA1c.

The invention claimed is:

1. A method of selecting an intensity of a light source for monitoring an analyte in blood, comprising the steps of:
providing the light source, the light source emitting light in a first wavelength into a tissue of a subject to obtain an analyte-pulse, the analyte-pulse having a first shape and a first size;
providing a second light source, the second light source emitting light in a second wavelength into the tissue of the subject to obtain a blood-pulse, the blood-pulse having a second shape and a second size;
adjusting the intensity of the light emitted by the light source and/or an intensity of the light emitted by the second light source until the first shape of the analyte-pulse and the second shape of the blood-pulse are similar,
wherein, when first shape of the analyte-pulse and the second shape of the blood-pulse are similar, a ratio of the first size of the analyte-pulse and the second size of the blood-pulse quantifies a presence of the analyte in the blood of the subject.

2. A method of selecting the intensity of a light source for monitoring an analyte in blood as claimed in claim 1, further comprising the step of:
comparing the size of the analyte-pulse with the size of the blood-pulse to monitor the analyte.

3. A method of selecting the intensity of a light source for monitoring an analyte in blood as claimed in claim 1, wherein,
the analyte in the blood in an artery of the subject is glycated haemoglobin;
the first wavelength being selected from:
1) About 275 nm
2) about 340 nm to 350 nm
3) About 415 nm to 420 nm
4) About 540 nm; or
5) About 580 nm; and
the second wavelength being in a red or infrared range.

4. A method of selecting the intensity of a light source for monitoring an analyte in blood as claimed in claim 1, comprising the further steps of:
providing a third light source, the third light source emitting light in a third wavelength into the tissue of the subject to obtain a second-analyte-pulse, the second-analyte-pulse having a shape and a size;
adjusting the intensity of the light emitted by the light source, the intensity of the light emitted by the second light source and/or the intensity of the light emitted by the third light source until the shape of the analyte-pulse, the shape of the second-analyte-pulse and the shape of the blood-pulse are similar.

5. A method of selecting the intensity of a light source for monitoring an analyte in blood as claimed in claim 4, further comprising the step of:
subtracting an amplitude of the second-analyte-pulse from an amplitude of the analyte-pulse to provide a reduced analyte-pulse;
comparing a size of the reduced analyte-pulse with the size of the blood-pulse to monitor the analyte.

6. A method of expressing a quantity of an analyte in blood, comprising:
performing the method of claim 1; and
determining a ratio of a size of a pulse obtained by measuring an absorbance by the analyte of the light of the first wavelength to a size of a pulse obtained by measuring an absorbance by the blood of the light of the second wavelength;

the analyte having an absorbance spectrum that shows an absence of any significant absorbance peak in the second wavelength; wherein the pulse of the first wavelength has the same shape as the pulse of the second wavelength.

7. A method of expressing a quantity of an analyte in blood as claimed in claim 6, wherein, the analyte is glycated haemoglobin;

the first wavelength being selected from:
1) About 275 nm
2) About 340 nm to 350 nm
3) About 415 nm to 420 nm
4) About 540 nm; or
5) About 580 nm; and the second wavelength being in a red or infrared range.

8. A method of expressing a quantity of an analyte in blood, as claimed in claim 7, further comprising the step of:

determining that the quantity of glycated haemoglobin is indicative of pre-diabetes.

9. A method of expressing a quantity of an analyte in blood, as claimed in claim 7, further comprising the step of:

providing calibration to convert an expression of the quantity of glycated haemoglobin into a physical quantity of the glycated haemoglobin.

10. A method of expressing a quantity of an analyte in blood, as claimed in claim 7, further comprising the step of:

providing information describing a long term monitoring of diet control for the subject for detecting pre-diabetes.

11. A blood analyte monitor comprising:

a sensor assembly having at least one light source and at least one optical sensor;

the sensor assembly configured to:
generate light of a first wavelength to obtain a first pulse signal having a first shape and a first size; and
generate light of a second wavelength to obtain a second pulse signal having a second shape and a second size,
wherein the light of the first wavelength and the light of the second wavelength pass through a tissue of a subject to be detected by the at least one optical sensor;

an adjustment module configured to adjust an intensity of the light of the first wavelength and/or the light of the second wavelength until the first shape of the first pulse signal obtained by the first wavelength and the second shape of the second pulse signal obtained by the second wavelength are similar;

wherein, when the first shape of the first pulse signal and the second shape of the second pulse signal are similar, a ratio of the first size of the first pulse signal and the second size of the second pulse signal quantifies a presence of an analyte in blood of a subject.

12. A blood analyte monitor, as claimed in claim 11, wherein, the sensor assembly comprises two sensors, a first sensor and a second sensor;

the first sensor having a first light source which emits the light in the first wavelength and a first optical sensor which detects the light in the first wavelength;

the second sensor having a second light source which emits the light in the second wavelength and a second optical sensor which detects the light in the second wavelength.

13. A blood analyte monitor as claimed in claim 11, wherein, the first wavelength is selected from:
1) About 275 nm
2) about 340 nm to 350 nm
3) About 415 nm to 420 nm
4) About 540 nm; or
5) About 580 nm; and the second wavelength being in a red or infrared range.

14. A blood analyte monitor as claimed in claim 11, wherein, the sensor assembly is capable of further generating light of a third wavelength through the tissue of the subject to be detected by the at least one sensor;

the adjustment module capable of adjusting the intensity of the light of the first wavelength, the light of the second wavelength and the light of the third wavelength to provide the shape of the pulse signal obtained by the first wavelength, the shape of the pulse signal obtained by the second wavelength and a shape of a pulse signal obtained by the third wavelength are similar, the further pulse signal having a shape and a size.

15. A blood analyte monitor, as claimed in claim 11, wherein the analyte is glycated haemoglobin.

* * * * *